United States Patent

Wu et al.

[11] Patent Number: 6,047,226
[45] Date of Patent: Apr. 4, 2000

[54] ENHANCED STELLAR ATTITUDE DETERMINATION SYSTEM

[75] Inventors: Yeong-Wei Andy Wu, Rancho Palos Verdes; Garry Didinsky; Douglas H. Hein, both of Los Angeles, all of Calif.

[73] Assignee: Hughes Electronics Corporation, Los Angeles, Calif.

[21] Appl. No.: 09/105,621

[22] Filed: Jun. 26, 1997

[51] Int. Cl.[7] .............................. G06F 7/70; B64G 1/24
[52] U.S. Cl. .................................. 701/13; 701/8; 701/3; 244/164; 244/165; 244/171; 250/330; 73/10; 73/1.79
[58] Field of Search .............................. 701/3, 4, 13, 10, 701/120, 222, 226; 340/973, 974, 978, 979; 244/165, 171, 176, 164, 166, 195, 169, 17.13, 3.16; 250/330, 342, 202, 203.1, 203.6, 206.1, 372; 73/1.78 R, 10, 504.08, 1.79

[56] References Cited

U.S. PATENT DOCUMENTS

| | | | |
|---|---|---|---|
| 5,100,084 | 3/1992 | Rahn et al. | 701/226 |
| 5,109,346 | 4/1992 | Wertz | 701/226 |
| 5,141,177 | 8/1992 | Wright et al. | 701/8 |
| 5,259,577 | 11/1993 | Achkar et al. | 244/164 |
| 5,323,322 | 6/1994 | Mueller et al. | 701/226 |
| 5,335,179 | 8/1994 | Boka et al. | 701/226 |
| 5,348,255 | 9/1994 | Abreu | 244/171 |
| 5,452,869 | 9/1995 | Basuthakur et al. | 244/164 |
| 5,562,266 | 10/1996 | Achkar et al. | 244/171 |
| 5,582,368 | 12/1996 | Stetson, Jr. | 244/165 |
| 5,614,897 | 3/1997 | Durnford | 340/973 |
| 5,672,872 | 9/1997 | Wu et al. | 250/330 |
| 5,686,719 | 11/1997 | Elkin | 250/203.1 |
| 5,751,853 | 5/1998 | Michael | 382/203 |

OTHER PUBLICATIONS

"Spacecraft Attitude Determination and Control," *Astrophysics and Space Science Library*, J.R. Wertz et al, vol. 73, pp 459–469 and 703–709. Jan. 1978.

"Optimal Linear Filtering," *Applied Optimal Estimation*, A. Gelb et al, 11th printing 1989, pp 102–119. Jan. 1974.

*Primary Examiner*—Jacques H. Louis-Jacques
*Attorney, Agent, or Firm*—Terje Gudmestad Georgann Grunebach; Michael W. Sales

[57] ABSTRACT

Spacecraft attitude is efficiently controlled by utilizing spatial noise and temporal noise in the calculation of gains to a Kalman filter. Spatial noise is modeled in a dynamic fashion so as to provide optimal spatial noise attenuation.

11 Claims, 8 Drawing Sheets

ENHANCED STELLAR ATTITUDE DETERMINATION SYSTEM

BACKGROUND

1. Field of the Invention

This invention relates to stellar attitude determination systems.

2. Description of the Related Art

Commonly used stellar attitude determination systems incorporate measurements from attitude sensors to compute an estimate of spacecraft attitude. The estimate of spacecraft attitude is implemented in a form of Kalman filter which employs a data processing algorithm to estimate attitude, with inputs from attitude sensor data. For further detail on Kalman filters generally, see *Applied Optimal Estimation*, The Analytic Sciences Corporation, Edited by Arthur Gelb, 1974, pages 103–119.

The attitude sensors can include gyroscopes, which provide inertial rate data, and star trackers which provide horizontal and vertical star image positions with signals and generated from a Charge Couple Device array (CCD array). A CCD array is an array of detectors which receive photons from a light source, and convert the detected photons into an electrical signal. The spacecraft attitude is computed in an Attitude Propagation Module, which numerically integrates the compensated gyro data. The Kalman filter, implemented in an Attitude Update Module, computes the attitude correction and gyro bias estimate using the measurement residuals and Kalman filter gains. The measurement residuals, computed in a Star Tracker Data Processing Module, are the difference between the measured star horizontal and vertical positions provided by the star trackers and the estimated star horizontal and vertical positions. The estimated star horizontal and vertical positions are computed using the current attitude estimate. The Kalman filter gains determine the attenuation applied to the filter output.

In the context of star tracker data, the Kalman filter is a low pass filter which outputs attitude correction data. With respect to the inertial rate data, the Kalman filter is a high pass filter used to estimate gyro bias, which is a slowly varying component of the gyro measurement error.

There are two primary sources of error in the determination of attitude: random noise, also known as white noise, and spatial noise. Current art combines both forms of error into temporal noise, which is a pure frequency domain noise that is compensated for by using manufacturer noise specifications in the calculation of measurement residuals. Random noise is caused by random signals generated by the analog electronics as well as background electrical noise, and exists in the frequency domain as temporal noise. Spatial noise, or spatially dependent error, is due to the spatial location of a spacecraft relative to a star detected by the CCD array for purposes of attitude determination. This type of error is deterministic in nature; some factors which can cause this form of error include the particular position on the CCD array of an imaged star, and the spacecraft's motion and speed. Spatial noise can be broken down into two primary components: Low Spatial Frequency (LSF) Error and High Spatial Frequency (HSF) Error. Due to the motion of the spacecraft, both errors affect the frequency domain in the form of temporal noise, such that LSF is converted to low frequency temporal noise, while HSF is converted to high frequency temporal noise. Spatial errors can affect temporal error but are not random in nature; they are actual errors in measurements taken from attitude sensors, dependent upon the spatial conditions of the spacecraft such as its spin, velocity and acceleration.

Currently, white noise is combined with spatial noise in the calculation of Kalman filter gains in attitude determination systems. The manufacturer's error specification consists primarily of a combination of random noise measurements and spatial noise, statically determined at the manufacturer's facility. As spatially dependent errors are determined by such factors as real time spacecraft star tracker CCD array measurements and spacecraft motion, the manufacturer noise specifications are not optimal.

Star tracker and gyroscope white noise is compensated for in filter gain calculations by using a pre-selected measurement noise covariance matrix whose values depend upon the sensor total noise specification supplied by the manufacturer. The Kalman filter uses the pre-selected measurement noise covariance matrix to calculate filter gains, which are used to compute attitude sensor error adjustment data in the form of measurement residuals. The attitude update module uses these measurement residuals to compute attitude correction data, which are supplied to an attitude propagation module within the spacecraft control processor. Because a star tracker contains an additional element of changing spatial conditions which give rise to spatially dependent errors which vary with actual spacecraft conditions, the resulting adjustments to the Kalman filter gain do not provide optimal attitude determination performance.

The common method used today to derive the Kalman filter gain matrix $K_c$ by which the filter is adjusted is given by the following equation:

$$K_c = P^-_{tot} H (H P^-_{tot} H^T + GRG^T)^{-1} \quad (1)$$

where $$P^-_{tot}$$

is the total error covariance matrix and $P^-$ denotes the determination of the matrix before a star observation at time t.

$$P^-_{tot}$$

is derived by taking the sum of $$P^-_{temp}$$

and $$P^-_{spatial},$$

given by the following equation:

$$P^-_{tot} = P^-_{temp} + P^-_{spatial} \quad (2)$$

and $$P^-_{tot} = \phi P^+_{tot}(t - \Delta t)\phi^T + \Gamma Q_n \Gamma^T \quad (3)$$

with $$P^-_{temp}$$

denoting the error covariance matrix due to temporal noise, and $$P^-_{spatial},$$

the error covariance matrix due to spatial noise. H is the stellar measurement matrix, with $H^T$ representing the transpose of this matrix, G is the noise sensitivity matrix and $G^T$ is its transpose, while R is the measurement noise covariance matrix. The R matrix is the primary component in equation (1), the determination of star tracker white and spatial noise attenuation of the Kalman filter. For equation 3 above, $\phi$ is the state transition matrix while $\phi^T$ is its transpose, $\Gamma$ is the process noise sensitivity matrix with $\Gamma^T$ as the transpose, and $Q_n$ is the error covariance matrix of gyroscope noise as calculated from gyroscope manufacturer specifications. $P^+$ $(t-\Delta t)$ is the error covariance matrix after a given time $t-\Delta t$.

These equations are conventional for the determination of $K_c$, and typically carried out on a computer aboard the spacecraft. Further details on determining spacecraft attitude can be found in *Spacecraft Attitude Determination and Control*, Computer Sciences Corporation, Edited by James R. Wertz, 1986, pages 459–469 and 703–709.

SUMMARY OF THE INVENTION

The invention determines spacecraft attitude by accounting not only for white noise error drawn from attitude sensor manufacturer specifications, but also for the spatially dependent error associated with attitude sensor measurements. These error factors are used to adjust the gain of a Kalman filter, the output of which provides attitude correction to spacecraft attitude estimation. In contrast to prior approaches which adjust Kalman filter gains based upon the combined random and spatially dependent error specifications provided by the attitude sensor manufacturer, the current invention provides a method to dynamically characterize spatially dependent error. The dynamic determination of spatial error is then used in conjunction with manufacturer specified random noise measurements to optimally adjust the Kalman filter gains. The spatially dependent errors are computed off-line by simulation, as they arise in actual measurements of stellar bodies taken by a star tracker. By including real time spatially dependent error computation in the error covariance matrix, the attitude correction data supplied to the attitude propagation module of the spacecraft control processor results in significantly increased accuracy in attitude determination and control.

A preferred implementation of the invention includes attitude sensors, a control processor and attitude control actuators. The control processor resides in an onboard computer which processes attitude sensor data and spacecraft control signals, and provides attitude control signals. The control processor consists of a star tracker data processing module, an attitude update module in the form of a Kalman filter, a rate sensor data processing module, an attitude propagation module and an attitude control module. The attitude sensors typically consist of a gyroscope (a form of inertial rate measurement unit) and a star tracker based on CCD array technology. The attitude control actuators typically consist of external motors that adjust spacecraft attitude.

The star tracker data processing module receives data from the star tracker and produces an output consisting of the stellar measurement matrix H, which provides positional data of a stellar body as detected by the CCD array, based upon a catalog of stars and measurement residuals. The attitude update module receives the stellar measurement matrix H and measurement residuals from the star tracker data processor, using Kalman filtering in the calculation of attitude correction data, and outputs the computed attitude correction data. The gyroscopic measurement residuals (also referred to as gyro bias estimate), based on gyroscope manufacturer noise specifications, are received by the rate sensor data processing module, while attitude correction data is received by the attitude propagation module. The gain of the Kalman filter is computed from a Kalman filter gain matrix, discussed below. This module also determines star tracker spatially dependent error by modeling the star tracker in a simulation using actual measured star data as test data. The spatially dependent error is used to compute the adjusted star tracker temporal noise variance, which is in turn used in the calculation of the Kalman filter gain matrix, K. The optimal Kalman filter gain matrix is computed with gyroscope and star tracker white noise, as well as star tracker spatially dependent noise. Once the optimal filter gain is determined, the Kalman filter is adjusted and thereafter provides output in the form of attitude correction data, by attenuating measurement errors, to the attitude propagation module. The attitude update module also outputs gyro bias estimate data obtained from the Attitude Update Module to the rate sensor data processing module.

The rate sensor data processing module receives gyroscopic data from the gyroscope and outputs compensated gyro data to the attitude propagation module.

The attitude propagation module receives attitude correction data from the attitude update module and compensated gyro data from the rate sensor data processing module. This module provides an output in the form of attitude estimate data which is received by the attitude control module and the attitude update module.

The attitude control module outputs attitude control data to the attitude control actuators. To optimize attitude determination performance, a method is set forth to adjust the time varying filter gains of a Kalman filter based upon temporal and spatially dependent star tracker error.

A model of star tracker spatial error is used in the determination of attitude of the spacecraft in addition to star tracker random noise and gyroscope random noise. The model consists of vertical and horizontal component of star tracker spatial error, each based on actual star tracker spatial error measurements, star tracker random noise measurements determined by manufacturer specifications, and a model of star tracker spatial noise measurements.

The model of star tracker spatial noise measurements consists of the sum of LSF and HSF components. Each of these components is modeled as a function of vertical and horizontal star tracker spatial noise measurement. The LSF component is modeled as a polynomial function, with the numeric coefficients to the terms of the polynomial determined so that the function approximates LSF component of spatial noise measurement. The HSF component is modeled as a sinusoidal function, in which numeric coefficients, phase offset coefficients, and row (in the case of the HSF component) or column (in the case of the LSF component) phasing coefficients are determined so that the function approximates the HSF component of the spatial noise measurement.

DETAILED DESCRIPTION OF THE INVENTION

The current invention sets forth a method and apparatus to control the attitude of a spacecraft. A spacecraft will typically carry attitude sensors whose measurements are subject to random noise and spatially dependent noise. Previous systems compensate for these error sources with the use of static manufacturer supplied attitude sensor noise specifications, whereas the current invention dynamically compensates for spatial error, based upon actual spacecraft spatial conditions. Utilizing manufacturer noise specifications and actual measurements, an error model of the star tracker spatial error is constructed. The modeled error is then used in the Kalman filter design to optimally determine spacecraft attitude.

Figure 1:
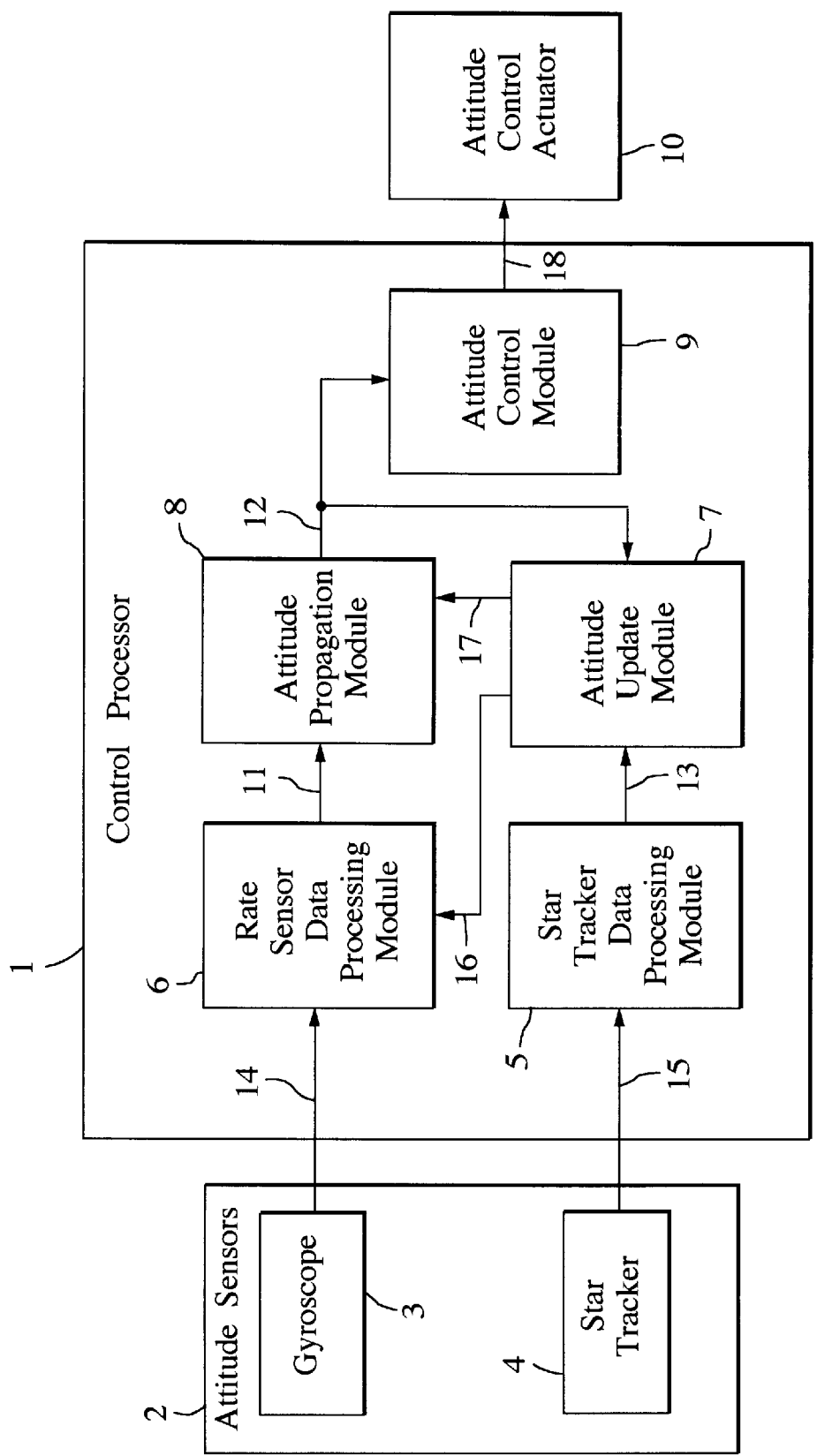
FIG. 1 is a block diagram of a spacecraft control processor which incorporates the invention.

Referring to FIG. 1, the control processor 1 of the enhanced stellar attitude determination system receives attitude data from attitude sensors 2, which preferably consist of one or more gyroscopes 3 and one or more star trackers 4. A star tracker data processing module 5 of the control processor 1 receives stellar data 15 consisting of stellar positional measurements received by the CCD array of the star tracker 4, and provides a star data stellar measurement matrix H and measurement residuals 13 to an attitude update module 7. The attitude update module is preferably a Kalman filter, the gain of which is computed from a Kalman filter gain matrix $K_c$, described in connection with FIG. 2. The attitude update module 7 applies the Kalman filter gain matrix $K_c$, discussed in connection with FIG. 2, to adjust the Kalman filter by attenuating star tracker random and spatial noise. The adjusted Kalman filter outputs attitude correction data 17. The attitude update module 7 outputs gyro bias estimate data 16 derived from manufacturer specifications, to be received by the rate sensor data processing module 6. This module also outputs attitude correction data 17 to the attitude propagation module 8.

The rate sensor data processing module 6 receives gyroscopic data 14 from the gyroscopes 3 and gyro bias estimate data 16 from the attitude update module 7. The output from module 6 is compensated gyro data 11 that is delivered to the attitude propagation module 8. The gyroscopic data 14 and star data 15 collectively allow the spacecraft's spatial conditions, such as spin, velocity and acceleration, to be determined.

The attitude propagation module 8 receives attitude correction data 17 from the attitude update module 7 and compensated gyro data 11 from the rate sensor data processing module 6. This data is used to compute attitude estimate data 12 to be used by the attitude control module 9 and the attitude update module 7.

The attitude control module 9 receives attitude estimate data 12 from the attitude propagation module 8, and outputs attitude control data 18 to the attitude control actuators 10, which actually apply attitude control commands to a spacecraft.

Figure 2:
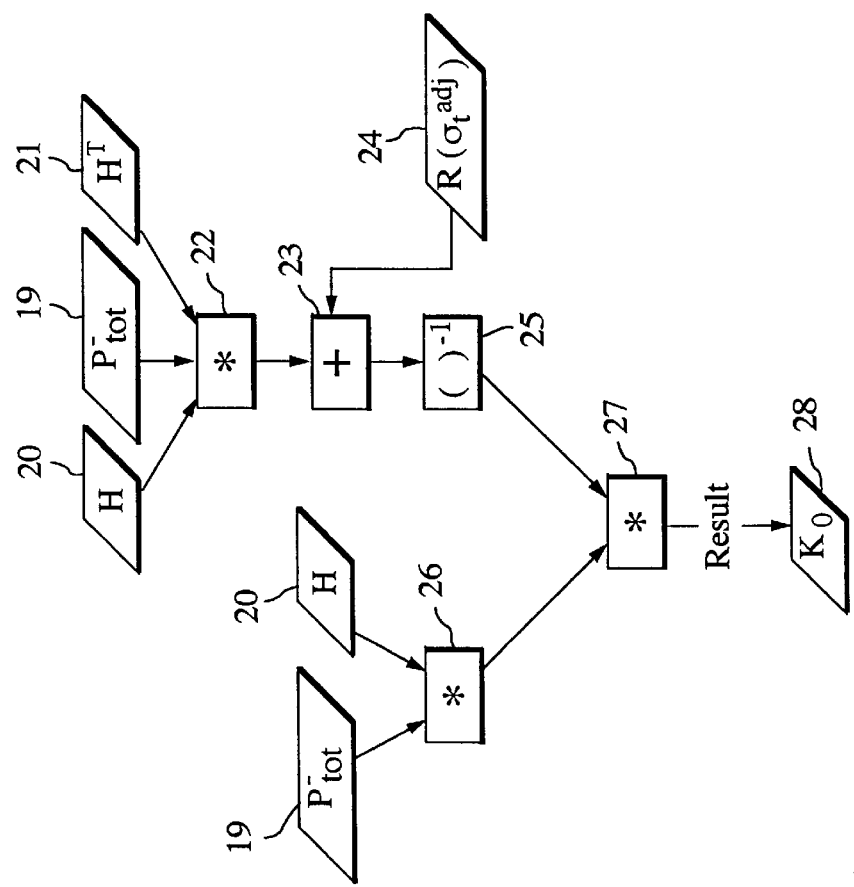
FIG. 2 is a flow diagram illustrating a determination of the Kalman filter gain matrix.

Referring to FIG. 2, the Kalman filter gain matrix $K_c$ 28 is calculated as a function of gyroscope and star tracker white noise, and of star tracker spatial noise. The measurement noise covariance matrix $R(\sigma_t^{adj})$ 24 is determined as a function of the adjusted star tracker temporal noise variance $\sigma_t^{adj}$, discussed in connection with FIG. 3 below, by multiplying $\sigma_t^{adj}$ by an identity matrix. $R(\sigma_t^{adj})$ 24 is summed 23 with the product 22 of the stellar measurement matrix H 20 multiplied 22 by the total error covariance matrix $$P_{tot}^-$$

19, discussed in connection with FIG. 4 below, and the transpose stellar measurement matrix $H^T$ 21. The inverse 25 of this sum 23 is multiplied 27 by the product 26 of the total temporal error covariance matrix $$P_{tot}^-$$

19 and the stellar measurement matrix H 20. The complete equation for the optimized Kalman filter gain matrix $K_c$ 28 is given by the following equation:

$$K_c = P_{tot}^- H \left( H P_{tot}^- H^T + R(\sigma_t^{adj}) \right)^{-1} \quad (4)$$

Figure 3:
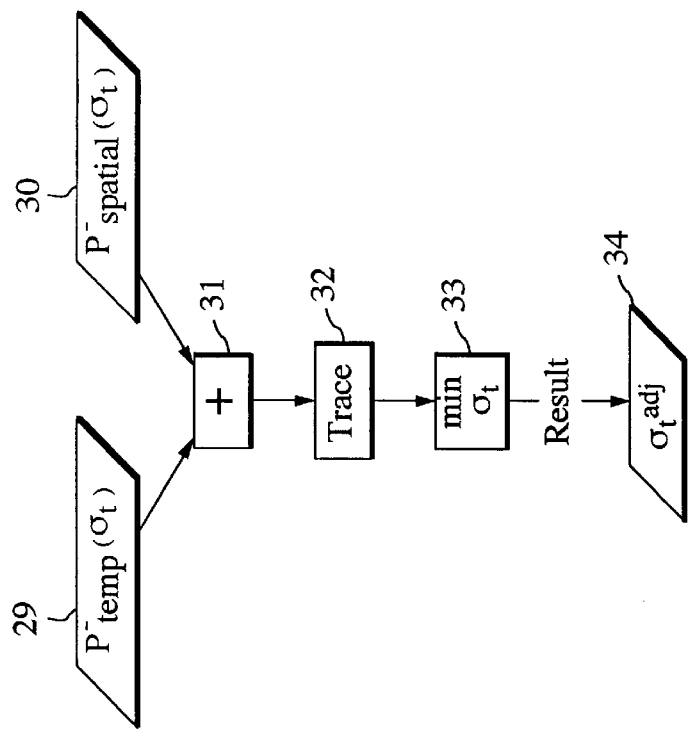
FIG. 3 is a flow diagram of a determination of the star tracker adjusted temporal noise variance matrix.

Referring to FIG. 3, the adjusted star tracker temporal noise variance $\sigma_t^{adj}$ 34 is determined. The adjusted star tracker temporal noise variance $\sigma_t^{adj}$ 34 is the trace 32 of the sum 31 of $$\bar{P}_{temp}$$

$(\sigma_t)$ 29 and $$\bar{P}_{spatial},$$

$(\sigma_t)$ 30, where $\sigma_t$ is minimized 33. The complete equation to determine the adjusted star tracker temporal noise variance matrix is given by the following equation:

$$\sigma_t^{adj} = \min_{\sigma_t}(\text{trace of }(\bar{P}_{temp}(\sigma_t) + \bar{P}_{spatial}(\sigma_t)))\qquad(5)$$

Figure 4:
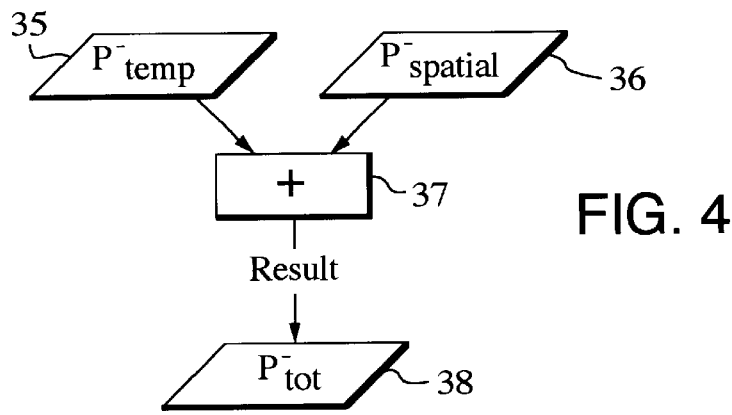
FIG. 4 is a flow diagram of a determination of the total temporal noise covariance matrix.

Referring to FIG. 4, the total temporal error covariance matrix 38 is determined by taking the sum 37 of the temporal error covariance matrix $$\bar{P}_{temp}$$

35 and the spatial error covariance matrix $$\bar{P}_{spatial}$$

36. The total operation is given by the following equation:

$$\bar{P}_{tot} = \bar{P}_{temp} + \bar{P}_{spatial}\qquad(6)$$

Figure 5A:
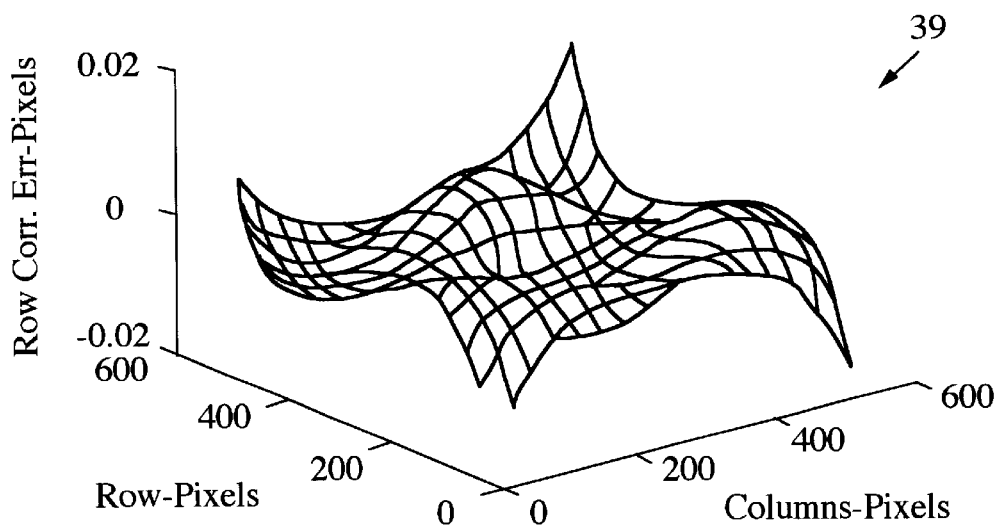
FIGS. 5A and 5B are graphical representations of the modeling of row and column LSF errors, respectively as polynomials.
Figure 5B:
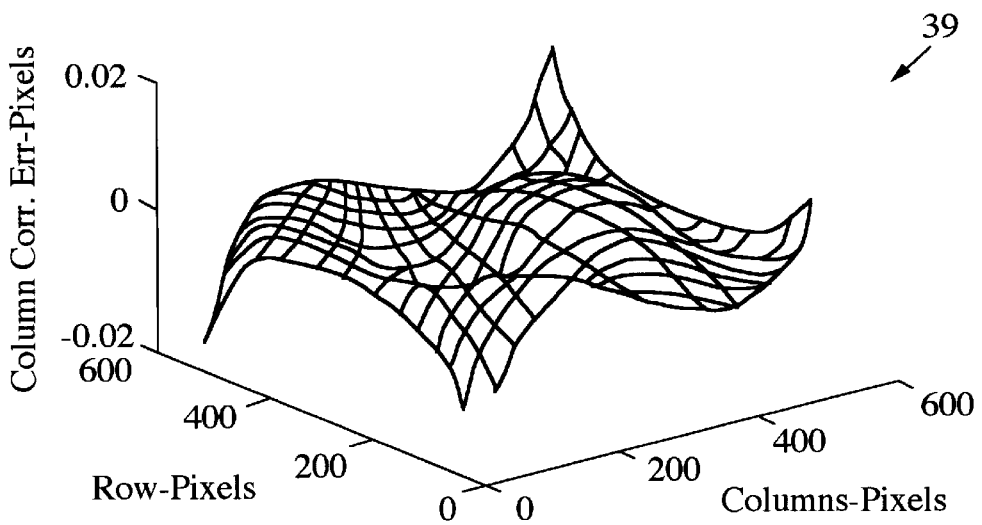
Figure 6A:
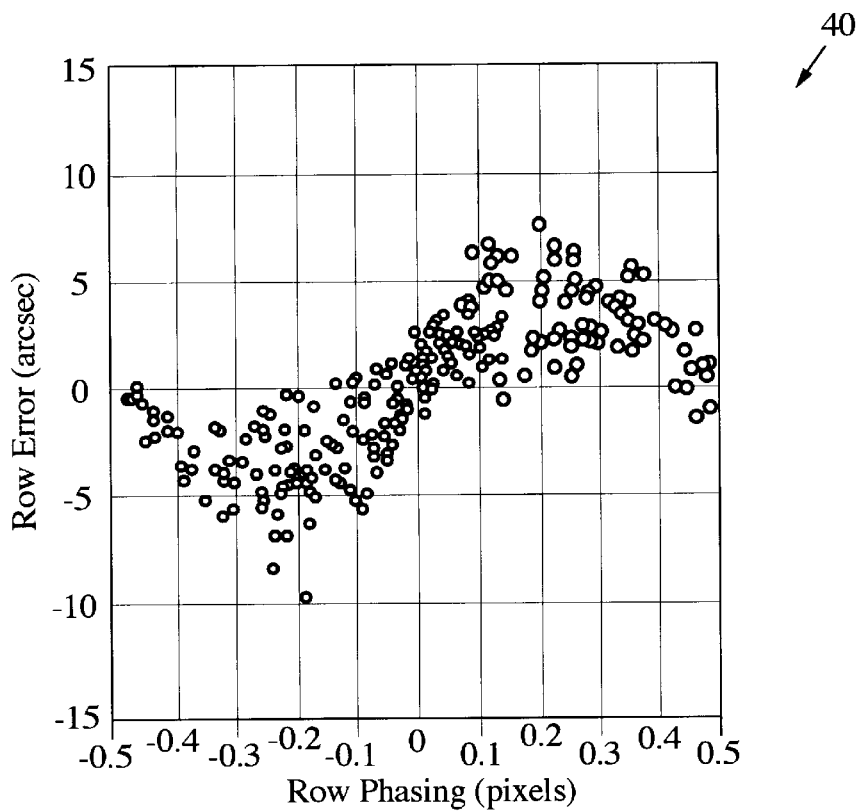
FIGS. 6A and 6B are graphical representations of the modeling of row and column HSF errors, respectively as sinusoidal functions.
Figure 6B:
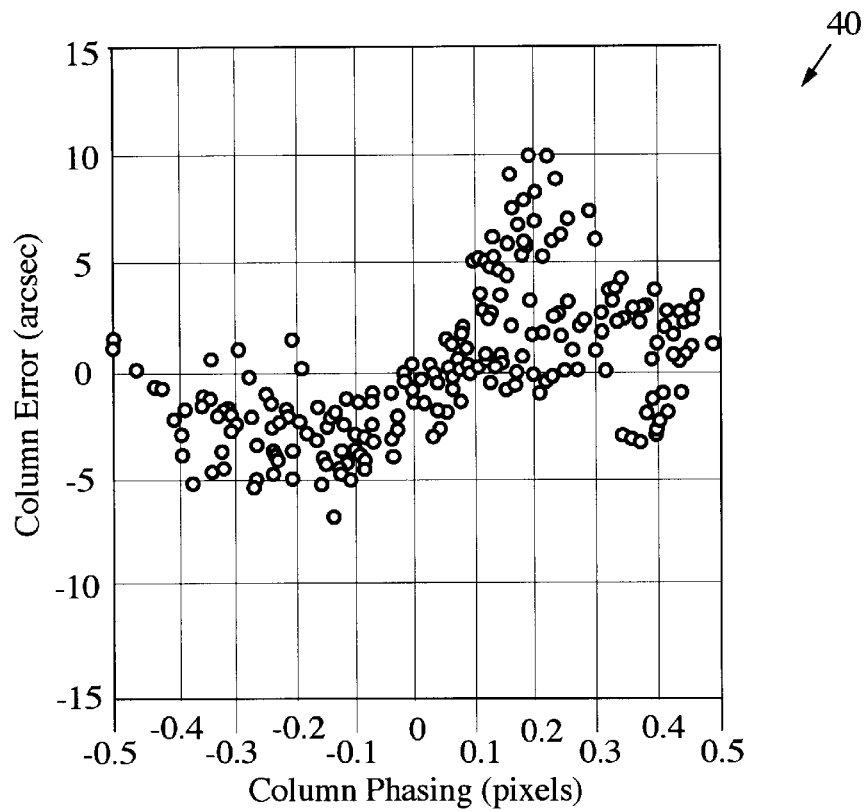

Referring to FIGS. 5A and 5B, based on star tracker spatial error measurements, LSF errors can be accurately modeled as up to third order polynomial functions 39 in both the horizontal (row) and vertical (column) channels (FIGS. 5A and 5B, respectively). The terms "horizontal" and "vertical" as used herein are somewhat arbitrary, since outer space does not provide a fixed frame of reference for such terms in the earth-bound sense. "Horizontal" and "vertical" as used herein are terms of convenience to refer generally to mutually orthogonal axes. Referring to FIGS. 6A and 6B, HSF errors are modeled as sinusoidal functions with a spatial period of one pixel 40.

Figure 7:
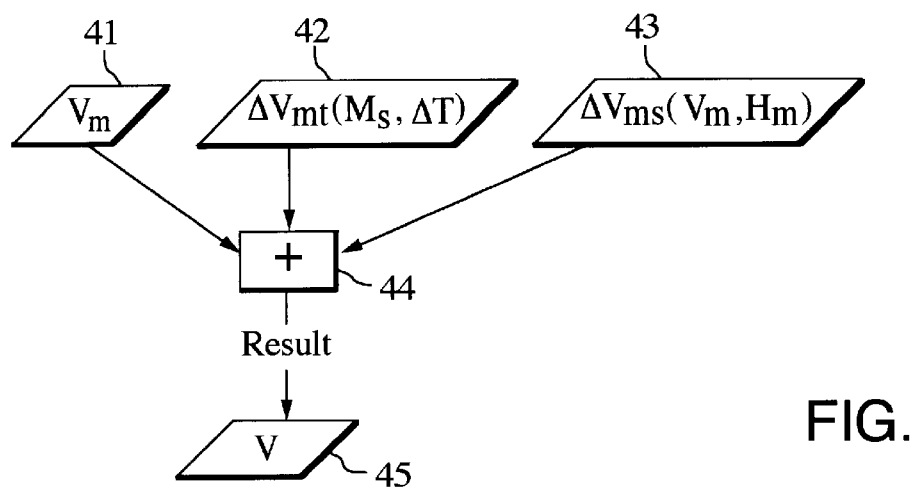
FIG. 7 is a flow diagram of a determination of the vertical component of star tracker spatial error.

Referring to FIG. 7, the vertical component V 45 of the star tracker error model consists of the sum 44 of the measured vertical component of an actual star $V_m$ 41, star tracker random noise error measurements $\Delta V_{mt}(M_s, \Delta T)$ 42, which are a function of star magnitude $M_s$ and integration time $\Delta T$, and star tracker spatial noise error measurements $\Delta V_{ms}(V_m, H_m)$ 43 which are a function of the measured vertical and horizontal components of star position, $V_m$ and $H_m$. $\Delta V_{mt}(M_s, \Delta T)$ 42 is determined using manufacturer error specifications, while $\Delta V_{ms}(V_m, H_m)$ 43 is determined by modeling of the spatial error, discussed further in connection with FIG. 8. This function is given by the following equation:

$$V=V_m+\Delta V=V_m+\Delta V_{mt}(M_s, \Delta T)+\Delta V_{ms}(V_m, H_m)\qquad(7)$$

Figure 8:
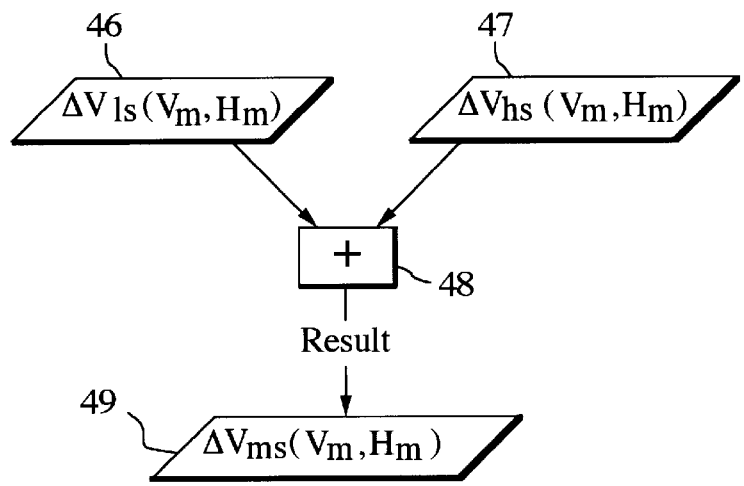
FIG. 8 is a flow diagram of a determination of star tracker spatial noise with respect to the vertical component of star tracker spatial error.
Figure 9:
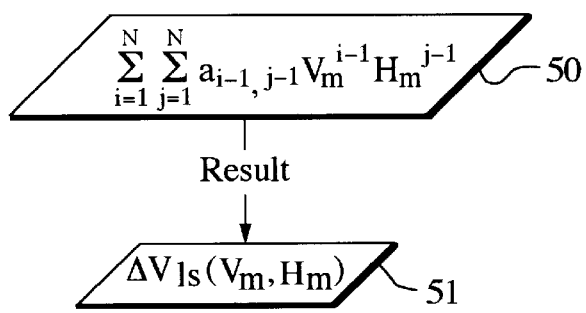
FIG. 9 is a flow diagram of a mathematical model of LSF, with respect to the vertical component of star tracker spatial error.
Figure 10:
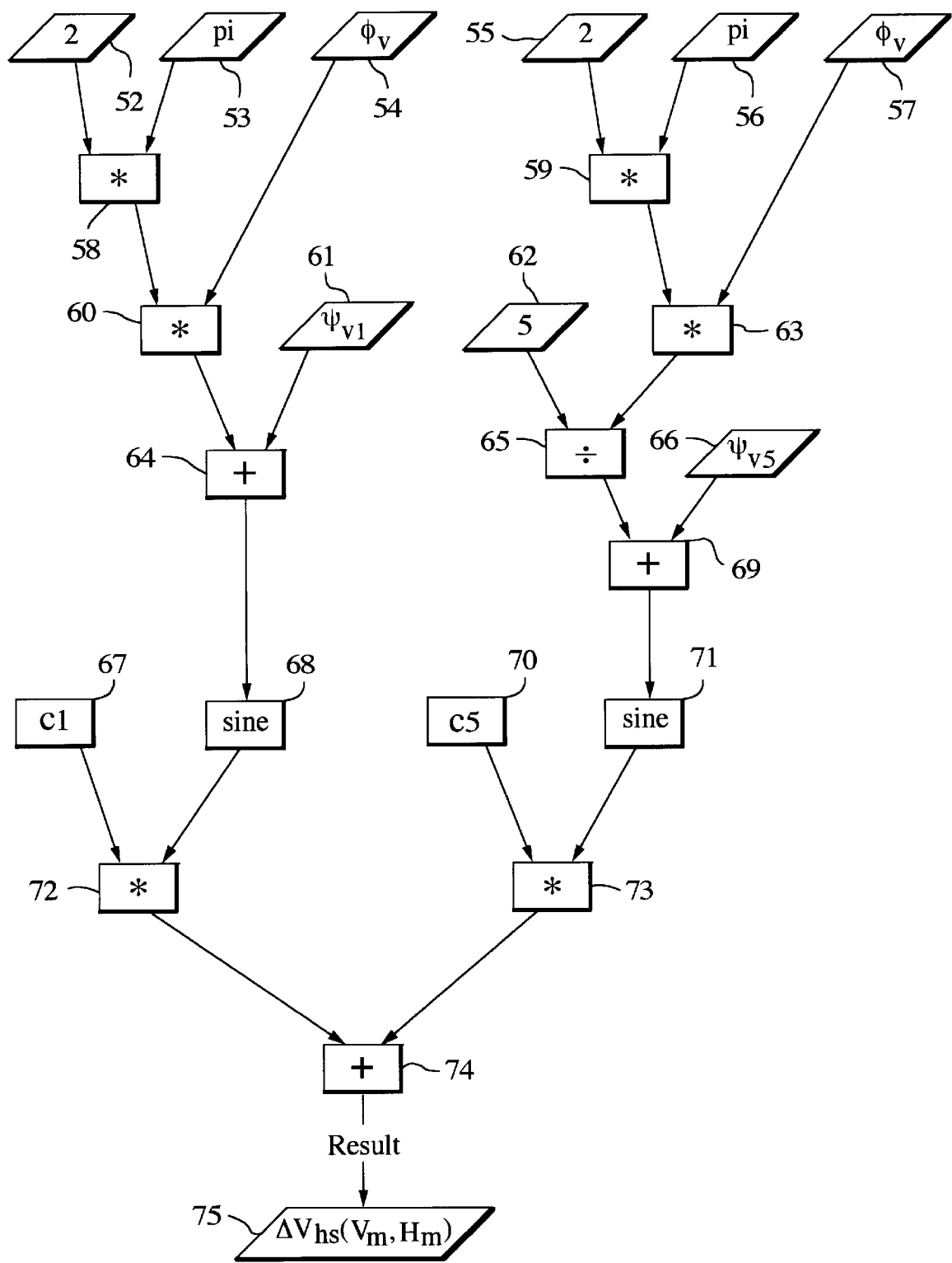
FIG. 10 is a flow diagram of a mathematical model of HSF, with respect to the vertical component of star tracker spatial error.

Referring to FIG. 8, $\Delta V_{ms}(V_m, H_m)$ 49 is the sum 48 of $\Delta V_{ls}(V_m, H_m)$ 46 which is the LSF mathematical model and discussed further in connection with FIG. 9, and $\Delta V_{hs}(V_m,$ $H_m)$ 47 which is the HSF mathematical model, discussed further in connection with FIG. 10. This function is given by the following equation:

$$\Delta V_{ms}(V_m, H_m)=\Delta V_{ls}(V_m, H_m)+\Delta V_{hs}(V_m, H_m)\qquad(8)$$

Referring to FIG. 9, $\Delta V_{ls}(V_m, H_m)$ 51 is a polynomial. The terms are constructed by a double summation 50: as i goes from 1 to N and j goes from 1 to N, the numeric coefficient $a_{i-1, j-1}$ is multiplied by $V_m^{i-1}H_m^{j-1}$, where $V_m$ is the measured star vertical component, and $H_m$ is the measured star horizontal component. The numeric coefficient $a_{i,j}$ is chosen so as to allow the polynomial function to most closely approximate actual spatial noise measurements. The function is given by the following equation:

$$\Delta V_{ls}(V_m, H_m)=\Sigma\Sigma a_{i-1, j-1}V_m^{i-1}H_m^{j-1}\qquad(9)$$

Referring to FIG. 10, $\Delta V_{hs}(V_m, H_m)$ 75 is the sum 74 of: c1 67 multiplied 72 by the sine 68 of the sum 64 of 104 $_{v1}$ 61 and the product 60 of $\phi_v$ 54 and the product 58 of the number two 52 and the constant pi 53, and c5 70 multiplied 73 by the sine 71 of the sum 69 of $\psi_{v5}$ 66 and the dividend 65 of the product 63 of $\phi_v$ 57, multiplied by the product 59 of the number two 55 and the constant pi 56, and the number five 62. The variables $\psi_{v1}$ 61, $\psi_{v5}$ 66 are phase offsets, $\phi_v$ 54 57 are column phasing in pixels, and c1 67 and c5 70 are numeric coefficients. Variables c1 67, c5 65, $\psi_{v1}$ 61, $\psi_{v5}$ 66 and $\phi_v$ 54 57 are determined so as to allow the sinusoidal function to most closely approximate actual error measurements. This function is given by the following equation:

$$\Delta V_{hs}(V_m, H_m) = c1 \cdot \sin(2\cdot\Pi\cdot\phi_v + \psi_{v1}) +\qquad(10)$$
$$c5\cdot\sin\left(\frac{2\cdot\Pi\cdot\phi_v}{5} + \psi_{v5}\right)$$

Figure 11:
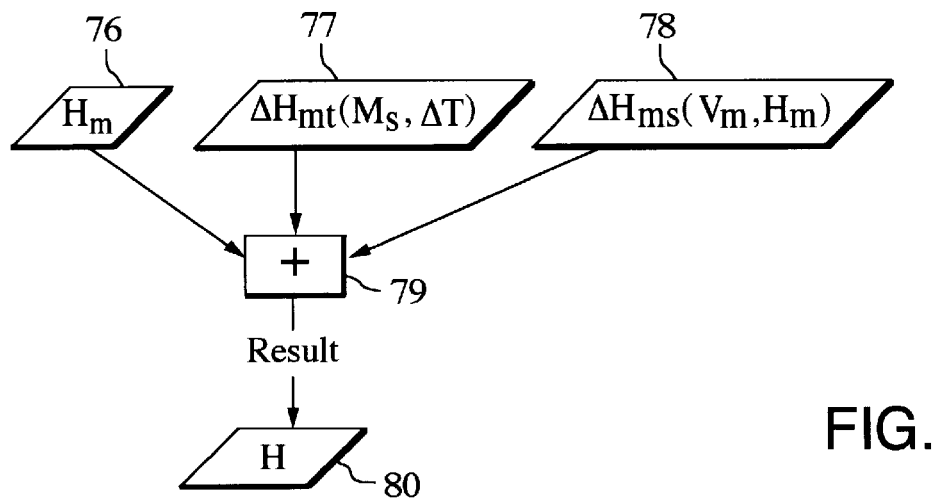
FIG. 11 is a flow diagram of a determination of the horizontal component of star tracker spatial error.

Referring to FIG. 11, the horizontal component H 80 of the star tracker error model consists of the sum 79 of the measured horizontal component of an actual star, $H_m$ 76, star tracker random noise error measurements $\Delta H_{mt}(M_s,\Delta T)$ 77, which are a function of star magnitude $M_s$ and integration time $\Delta T$, and star tracker spatial noise error measurements $\Delta H_{ms}(V_m, H_m)$ 78 which are a function of the measured vertical and horizontal components star position, $V_m$ and $H_m$. $\Delta H_{mt}(M_s, \Delta T)$ is determined using manufacturer error specifications, while $\Delta H_{ms}(V_m, H_m)$ is determined by modeling of the spatial error, discussed further in connection with FIG. 12. This function is given by the following equation:

$$H=H_m+\Delta H=H_m+\Delta H_{mt}(M_s, \Delta T)+\Delta H_{ms}(V_m, H_m)\qquad(11)$$

Figure 12:
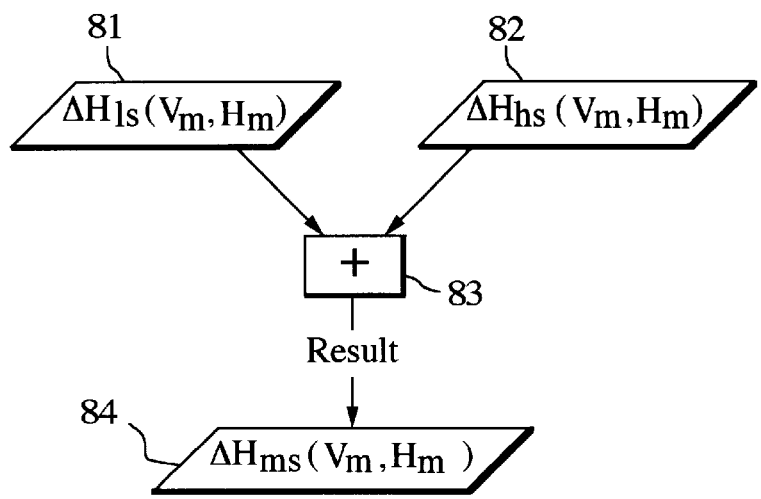
FIG. 12 is a flow diagram of a determination of star tracker spatial noise with respect to the horizontal component of star tracker spatial error.
Figure 13:
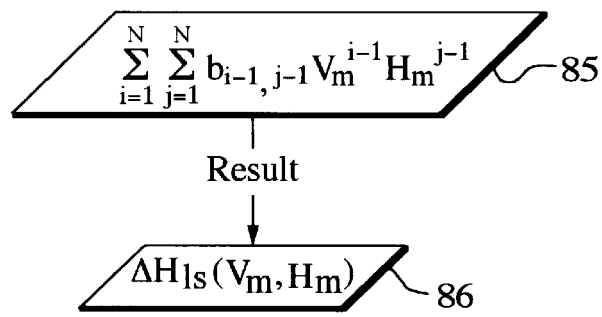
FIG. 13 is a flow diagram of a mathematical model of LSF, with respect to the horizontal component of star tracker spatial error.
Figure 14:
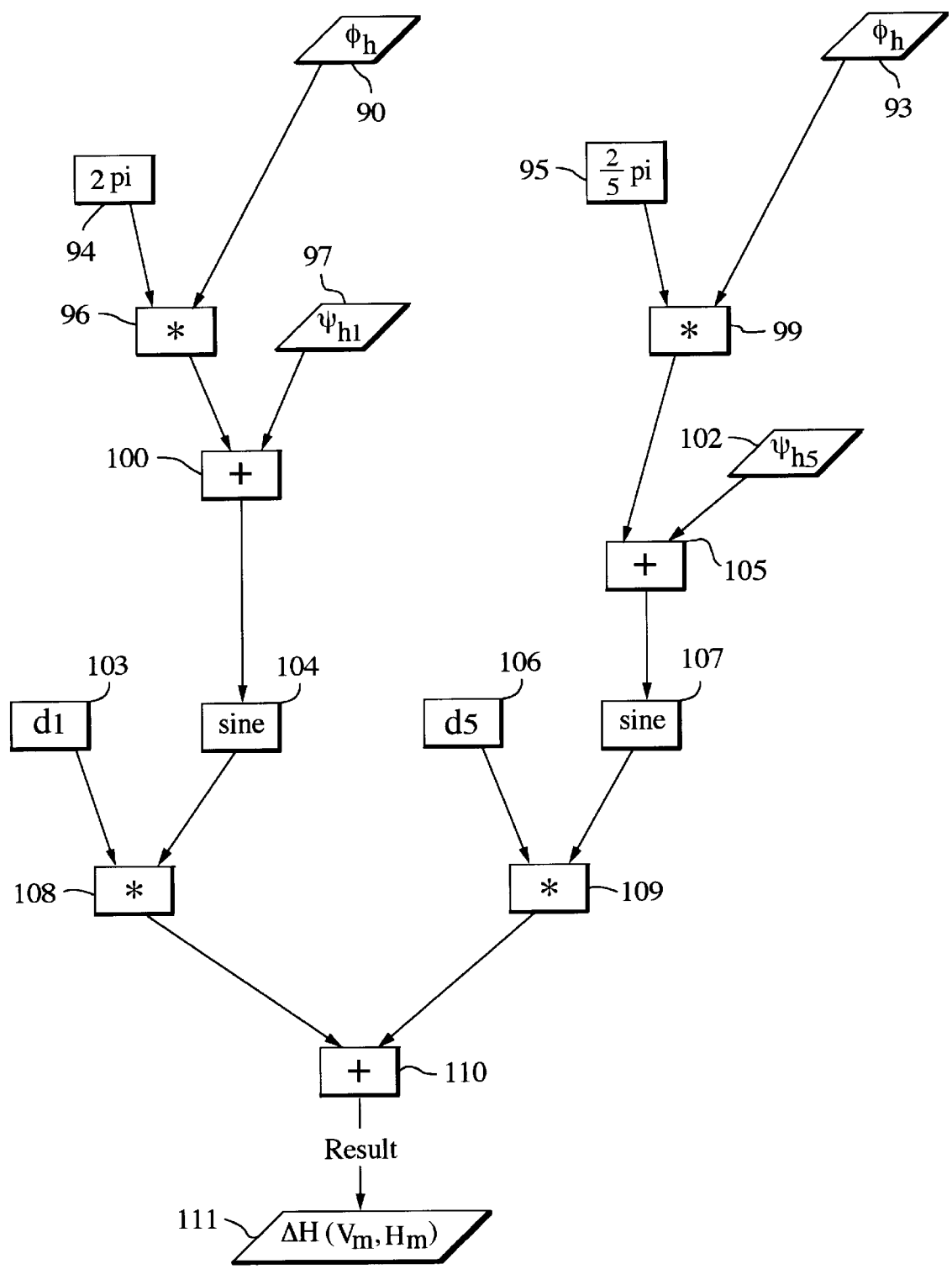
FIG. 14 is a flow diagram of a mathematical model of HSF, with respect to the horizontal component of star tracker spatial error.

Referring to FIG. 12, $\Delta H_{ms}(V_m, H_m)$ 84 is the sum 83 of $\Delta H_{ls}(V_m, H_m)$ 81 which is the LSF mathematical model and discussed further in connection with FIG. 13, and $\Delta H_{hs}(V_m,$ $H_m)$ 82 which is the HSF mathematical model, discussed further in connection with FIG. 14. This function is given by the following equation:

$$\Delta H_{ms}(V_m, H_m)=\Delta H_{ls}(V_m, H_m)+\Delta H_{hs}(V_m, H_m)\qquad(12)$$

Referring to FIG. 13, $\Delta H_{ls}(V_m, H_m)$ 86 is a polynomial. The terms are constructed by a double summation 85: as i goes from 1 to N and j goes from 1 to N, the numeric coefficient $b_{i-1, j-1}$ is multiplied by $V_m^{i-1}H_m^{j-1}$, where $V_m$ is the measured star vertical component, and $H_m$ is the measured star horizontal component. The numeric coefficient $b_{i,j}$ is chosen so as to allow the polynomial function to most closely approximate actual spatial noise measurements. The function is given by the following equation:

$$\Delta H_{ls}(V_m, H_m) = \Sigma\Sigma b_{i-1,j-1} V_m^{i-1} H_m^{j-1} \quad (13)$$

Referring to FIG. 14, $\Delta H_{hs}(V_m, H_m)$ 111 is the sum 110 of: (a) d1 103 multiplied 108 by the sine 104 of the sum 100 of (1) $\psi_{h1}$ 97 and (2) the product $\psi_{v5}$ 96 of $\phi_h$ 90 and the constant 2pi 94, and (b) d5 106 multiplied 109 by the sine 107 of the sum 105 of (1) $\psi_{h5}$ 102 and the product 99 of $\phi_v$ 93 multiplied by the constant 2/5 pi 95. The variables $\psi_{h1}$ 97, $\psi_{h5}$ 102 are phase offsets, $\phi_h$ 90, 93 are row phasing in pixels, and d1 103 and d5 106 are numeric coefficients. Variables d1 103, d5 106, $\psi_{h1}$ 97, $\psi_{h5}$ 96 and $\phi_h$ 90, 93 are determined so as to allow the sinusoidal function to most closely approximate actual error measurements. This function is given by the following equation:

$$\Delta H_{hs}(V_m, H_m) = d1 \cdot \sin(2 \cdot \Pi \cdot \phi_h + \psi_{h1}) + \quad (14)$$
$$d5 \cdot \sin\left(\frac{2 \cdot \Pi \cdot \phi_h}{5} + \psi_{h5}\right)$$

While the attitude determination algorithm described above is preferred, advantages of the present invention can be obtained in other ways. When the attenuation of gyro white noise error is decreased, the attenuation of star tracker white and spatial noise increases. Conversely, when gyro white noise error attenuation is increased, star tracker white- and spatial noise attenuation decreases. In equation 3 above, the term $Q_n$ determines gyro white noise attenuation. If gyro white noise were to be determined in a more dynamic fashion and attenuated by adjusting $Q_n$, the net effect would be the adjustment of the attenuation of star tracker white and spatial noise, the advantages of the present invention would be obtained.

Although star trackers are used in the preferred embodiment, the invention may also be carried out using other types of sensors commonly found on spacecraft, such as sun sensors and earth sensors.

While particular embodiments of the invention have been shown and described, numerous modifications and alternate embodiments may be made in these embodiments without departing from the spirit of the present invention. For that reason, the scope of the invention is limited only in terms of the appended claims.

We claim:

1. A method to control the attitude of a spacecraft which carries an onboard star tracker that is subject to a spatially dependent error that varies with the spacecraft's spatial conditions, comprising:

providing a model of spatially dependent error associated with said star tracker, dynamically sensing spacecraft spatial conditions while in flight to dynamically determine said spatially dependent error, dynamically adjusting said error model based upon said dynamically determined spatially dependent error, and dynamically controlling the spacecraft attitude based upon said dynamically adjusted error model.

2. The method of claim 1, wherein said star tracker is also subject to a random noise error, further comprising:

providing random noise specifications associated with said random noise error, and controlling the spacecraft attitude based upon said random noise specifications as well as said dynamically adjusted error model.

3. A spacecraft attitude control system for use with a spacecraft attitude sensor that provides a spacecraft attitude estimation and is subject to a spatially dependent error that varies with the spacecraft's spatial conditions, comprising:

a control processor programmed to provide a model of spatially dependent error associated with said sensor, and dynamic sensors which dynamically sense spacecraft spatial conditions while in flight, said control processor further programmed to dynamically determine said spatially dependent error based upon said sensed spacecraft spatial conditions, to dynamically adjust said error model based upon said dynamically determined spatially dependent error so as to provide attitude correction to said spacecraft attitude estimation, and to provide dynamic spacecraft attitude control signals based upon said dynamically adjusted error model.

4. The spacecraft attitude control system of claim 3, for use with spacecraft attitude sensors which are also subject to a random noise error, wherein said control processor is further programmed with random noise specifications associated with said random noise error, and to provide said dynamic spacecraft attitude control signals based upon said random noise specifications as well as said dynamically adjusted error model.

5. A spacecraft attitude control system for use with spacecraft attitude sensors comprising a gyroscope that outputs gyroscopic data and a star tracker that outputs star data, said star tracker being subject to a spatial noise error that varies with the spacecraft's spatial conditions and also to a random noise error, comprising:

a control processor programmed to provide a model of spatial noise error associated with said sensors, and dynamic sensors which dynamically sense spacecraft spatial conditions while in flight, said control processor further programmed to dynamically adjust said error model based upon spacecraft spatial conditions sensed by said dynamic sensors, and to provide dynamic spacecraft attitude control signals based upon said dynamically adjusted error model, said control processor being further programmed with random noise specifications associated with said random noise error, and to provide said dynamic spacecraft attitude control signals based upon said random noise specifications as well as said dynamically adjusted error model, said control processor including:

a star tracker data processing module connected to receive star data from said star tracker, and to provide an output in the form of a stellar measurement matrix H, an attitude update module connected to receive the stellar measurement matrix H from the star tracker data processing module, comprising:

a Kalman filter having a filter gain computed from a Kalman filter gain matrix, a star tracker spatial error determiner which determines said star tracker spatial error by dynamically modeling star tracker spatial error while the spacecraft is in flight, a calculator configured to calculate the Kalman filter gain matrix as a function of gyroscope random noise, star tracker random noise and star tracker spatial error, and a filter gain adjuster connected to adjust the Kalman filter gain as a function of gyroscope temporal noise, star tracker temporal noise and star tracker spatial error utilizing said Kalman filter gain matrix, said attitude update module providing outputs in the form of attitude correction data and gyro bias estimate data, a rate sensor data processing module connected to receive gyroscopic data from the gyroscope and gyro bias estimate data from the attitude update module, and to output compensated gyro data, and an attitude propagation module and an attitude control module, said attitude propagation module connected to receive attitude correction data from the attitude data module and compensated gyro data from the rate sensor data processing module, and to produce an output to the attitude control module and attitude update module in the form of attitude estimate data, said attitude control module connected to receive attitude estimate data from the attitude propagation module and to produce said spacecraft attitude control signals as an output.

6. The spacecraft attitude control system of claim 5, wherein said Kalman filter gain matrix $K_c$ is a function of gyroscope temporal noise, star tracker temporal noise and star tracker spatial noise and is given by:

$$K_c = P_{tot}^- (H(HP_{tot}^- H^T + R(\sigma_t^{adj})))^{-1},$$

where:

$P_{tot}^-$ is the sum of a temporal error covariance matrix $P_{temp}^-$ and a spatial error covariance matrix $P_{spatial}^-$, H is a stellar measurement matrix, $H^T$ is the transpose of H, $\sigma_t^{adj}$ is an adjusted star tracker temporal noise variance, and R is the identity matrix of $\sigma_t^{adj}$.

7. The spacecraft attitude control system of claim 6, in which said adjusted star tracker temporal noise variance $\sigma_t^{adj}$ is given by:

$$\sigma_t^{adj} = \min_t (\text{trace of } (P_{temp}^-(\sigma_t) + P_{spatial}^-(\sigma_t))),$$

where:

$P_{temp}^-$ is a temporal noise error covariance matrix, $P_{spatial}^-$ is a spatial noise error covariance matrix, and $\min_t \sigma$ is a minimum value for star tracker temporal noise variance.

8. A method of determining a spatially dependent error associated with a star tracker carried on board a spacecraft, said spatially dependent error consisting of Low Spatial Frequency error and High Spatial Frequency error, comprising:

taking dynamic measurements of star tracker spatially dependent error under in flight spatial conditions of said spacecraft, and using said measurements to create a model of star tracker spatially dependent error that includes vertical and horizontal components respectively comprising the sums of:

respective vertical and horizontal measured components of actual star tracker spatially dependent error $V_m$ and $H_m$, respective predetermined vertical and horizontal components of star tracker random noise as a function of star magnitude and integration time, and respective vertical and horizontal modeled components of star tracker spatially dependent error.

9. The method of claim 8, in which said vertical and horizontal modeled components of star tracker spatially dependent error respectively comprise the sum of Low and High Spatial Frequency error components as functions of measured vertical star position and measured horizontal star position.

10. The method of claim 9, in which said Low Spatial Frequency error component is modeled as a polynomial function of measured star vertical and horizontal positions.

11. The method of claim 9, in which said High Spatial Frequency error component is modeled as a sinusoidal function of measured star vertical and horizontal positions.

* * * * *